US012005365B2

(12) United States Patent
Verstraeten

(10) Patent No.: US 12,005,365 B2
(45) Date of Patent: Jun. 11, 2024

(54) GAMING MACHINE FOR PICKING UP AT LEAST ONE OBJECT, COMPRISING A RAIL STRUCTURE ABLE TO MOVE OVER A STANDING ZONE

(71) Applicant: Elaut N.V., Sint-Niklaas (BE)

(72) Inventor: Eric Verstraeten, Sint-Niklaas (BE)

(73) Assignee: Elaut N.V., Sint-Niklaas (BE)

( * ) Notice: Subject to any disclaimer, the term of this patent is extended or adjusted under 35 U.S.C. 154(b) by 222 days.

(21) Appl. No.: 17/523,422

(22) Filed: Nov. 10, 2021

(65) Prior Publication Data

US 2023/0141714 A1 May 11, 2023

(51) Int. Cl.
*A63F 9/30* (2006.01)
*G07F 17/32* (2006.01)

(52) U.S. Cl.
CPC ............ *A63F 9/30* (2013.01); *G07F 17/3297* (2013.01)

(58) Field of Classification Search
CPC ............................... A63F 9/30; G07F 17/3297
See application file for complete search history.

(56) References Cited

U.S. PATENT DOCUMENTS

| | | | |
|---|---|---|---|
| 5,397,134 | A | 3/1995 | Fishman et al. |
| 5,549,372 | A | 8/1996 | Lewis |
| D429,768 | S | 8/2000 | Smart |
| D433,716 | S | 11/2000 | Robrahn et al. |
| 6,283,475 | B1 | 9/2001 | Stubben |
| 6,899,337 | B2 | 5/2005 | Fisher et al. |
| 6,921,076 | B1 | 7/2005 | Norton |
| D516,128 | S | 2/2006 | Nunokawa |
| 7,080,840 | B1 | 7/2006 | Chen |
| 7,604,238 | B2 | 10/2009 | Verstraeten |
| 7,637,507 | B2 | 12/2009 | Peck et al. |
| D638,479 | S | 5/2011 | Verstraeten |
| D884,075 | S | 5/2020 | Fukazawa et al. |
| D989,877 | S | 6/2023 | Samson et al. |
| 2009/0267302 | A1 | 10/2009 | Fukazawa et al. |
| 2018/0264353 | A1 | 9/2018 | Chu et al. |
| 2020/0175822 | A1 | 6/2020 | Kim |
| 2020/0349803 | A1 | 11/2020 | Wronowski |
| 2021/0056809 | A1 | 2/2021 | Harris et al. |

(Continued)

FOREIGN PATENT DOCUMENTS

| | | | | |
|---|---|---|---|---|
| EP | 1322389 A1 | 7/2003 | | |
| EP | 3144040 A1 * | 3/2017 | ............... | A63F 9/30 |
| JP | H9285641 A | 11/1997 | | |

(Continued)

*Primary Examiner* — Raleigh W Chiu
(74) *Attorney, Agent, or Firm* — The Webb Law Firm

(57) ABSTRACT

A gaming machine for picking up one object, and moving the object through a playing zone to a dispensing zone, the gaming machine includes a housing having at least one sidewall enclosing the playing zone and the dispensing zone, and a roof, said sidewall and roof being configured such that a standing zone is created below said roof outside the playing zone, a rail structure in the housing and extending in a first direction X, the rail structure being configured to move over said standing zone in a second direction Y, and a grabber attached to a carriage which is moveably attached to the rail structure, the carriage being configured to move along the rail structure, the grabber being configured to pick up the object.

20 Claims, 7 Drawing Sheets

(56) References Cited

U.S. PATENT DOCUMENTS

2022/0088472 A1* 3/2022 Tsai .......................... A63F 9/30
2023/0141714 A1* 5/2023 Verstraeten ............... A63F 9/30
273/447

FOREIGN PATENT DOCUMENTS

JP 2002369963 A 12/2002
WO WO-2007066802 A1 * 6/2007 ............... A63F 9/30

* cited by examiner

GAMING MACHINE FOR PICKING UP AT LEAST ONE OBJECT, COMPRISING A RAIL STRUCTURE ABLE TO MOVE OVER A STANDING ZONE

BACKGROUND OF THE INVENTION

Field of the Invention

Various embodiments in this document relate to a gaming machine for picking up at least one object, in particular a prize to be won, and subsequently moving the object through a playing zone to a dispensing zone.

Description of Related Art

A known gaming machine comprises:

- a housing having at least one sidewall enclosing the playing zone and the dispensing zone,
- a rail structure arranged in the housing and extending in a first direction X,
- a grabber attached to a carriage which is moveably attached to the rail structure, the carriage being configured to move in the first direction X along the rail structure, the grabber being configured to pick up the at least one object.

Such a known gaming machine is however not entirely satisfactory. When moving a joystick so that the carriage can move above an object to be picked up and the grabber, e.g. having a plurality of claws, can be lowered to pick the object up, a user generally stands in front of the housing. The housing is generally a rectangular cuboid having flat transparent walls separating the player from the objects. As such the user feels much detached from the objects. During the game, the player controls the game from a distance rather than experiencing an explorative interaction with the objects inside the housing.

SUMMARY OF THE INVENTION

Some embodiments of the present disclosure relate to a gaming machine for picking up one or more object which gives its users a better experience when playing. In particular, one aim of the present disclosure is to give the users an immersive experience when trying to pick up their desired objects in the housing, while not significantly increasing the size of the gaming machine.

According to a first aspect of the invention, it is provided a gaming machine comprising a housing, a rail structure, and a grabber. The housing has at least one sidewall enclosing the playing zone and the dispensing zone, and a roof, said sidewall and roof being configured such that a standing zone is created for a person below said roof at the exterior of the playing zone delimited by the at least one sidewall. The rail structure is arranged in the housing and extending in a first direction X, the rail structure being configured to move over said standing zone in a second direction Y at an angle to the first direction X. The grabber is attached to a carriage which is moveably attached to the rail structure, the carriage being configured to move in the first direction X along the rail structure, the grabber being configured to pick up the at least one object.

Thanks to these features the grabber can move beside the person in addition to being in front of him. As such the person is more immersed in the gaming machine. In the meanwhile the size of the gaming machine is not significantly increased as the rail structure is able to move above a person.

The gaming machine according to the first aspect can also have one or several following features, according to all the technically possible combinations:

- the gaming machine comprises a control unit configured to control the movement of the carriage such that, when the rail structure is above the standing zone, the movement of the carriage along the rail structure is limited to an area delimited by the sidewall or avoided.

By limiting the movement of the carriage when a part of the rail structure is above the standing zone, the carriage and the grabber will not come into contact with the person in the standing zone. Thus the safety of the gaming machine user is improved.

- the aforementioned area delimited by the sidewall has a width lower than 1.5 metres in the first direction X.
- the playing zone has a width greater than 1.5 metres in the first direction X.

By setting the width of the playing zone relatively large, and setting the width of the aforementioned zone delimited by the sidewall relatively low, the user can have an extensive vista over the playing zone while retaining a sufficient area in which he can move around. In this way he can observe exactly what is happening in the playing zone while not much restricted by the sidewall.

- the standing zone is located entirely below the roof.

This layout blocks most external disturbance from above when the user is standing in the playing zone. He can therefore concentrate on operating the gaming machine and avoid being distracted.

- the standing zone is partially limited by a portion of the at least one sidewall and the roof.
- the standing zone has a projected area on the ground larger than 0.5 $m^2$.

0.5 $m^2$ is generally enough for a user during the operation of the gaming machine. In some cases this area gives the user the freedom to move around in the standing zone during the operation of the gaming machine. Consequently the user is not constricted when operating the gaming machine.

- the second direction Y is perpendicular to the first direction X.
- the standing zone has a depth in the second direction Y greater than 0.4 metre, preferably greater than 0.5 metre.

By having a relatively deep standing zone, the gaming machine can improve the experience of the user during its operation. The user penetrate deep enough into the gaming machine; he is more immersed in the gaming machine when he operates it.

- in the dispensing zone the carriage is configured to move together with the rail structure in the second direction Y while being blocked on the rail structure in the first direction X.

According to this feature the carriage has no freedom of its own inside the dispensing zone. It can only be brought along by the rail structure in the second direction Y out of and/or into the dispensing zone. In this way risks of collision between the grabber and/or the carriage are much reduced. Also, when a grabber with a picked-up object bumps with the sidewall it may drop the picked-up object accidentally. By blocking the movement of the carriage in the first direction X while it is in the dispensing zone allows it to hold a picked-up object more firmly within its claw.

the gaming machine comprises at least five sidewalls enclosing the playing zone and the dispensing zone, at least one sidewall of the at least five sidewalls delimiting the standing zone.

at least a portion of the at least one sidewall is transparent.

A partially transparent sidewall gives a user a better observation of what goes on inside the gaming machine.

the gaming machine comprises an input unit configured to receive commands from a player for moving the grabber, wherein the input unit is located in the standing zone.

By placing the input unit in the standing zone, the player can remain in the standing zone throughout his operating of the gaming machine without having to leave the standing zone. Thus he can concentrate on operating the gaming machine without being distracted.

the control unit is configured to move the carriage between the dispensing zone and the playing zone while ignoring commands from the input unit.

This enables the carriage to move according to predetermined routes when moving between the dispensing zone and the playing zone. This can be particularly advantageous at the beginning of the game before the player is given free control of the carriage in the playing zone. This can be particularly advantageous towards the end of the game to move the carriage back to the dispensing zone from the playing zone, the grabber with or without an object picked up.

According to a second aspect of the invention, it is provided a gaming machine comprising:

a housing defining a standing zone for a player, a rail structure extending in a first direction X, the rail structure being configured to move in a second direction Y at an angle to the first direction X, a grabber attached to a carriage which is moveably attached to the rail structure, the carriage being configured to move in the first direction X along the rail structure, the grabber being configured to pick up the at least one object, an input unit configured to be controlled by a player, a control unit configured to, during a pre-playing sequence during which a player cannot control a movement of the grabber through the input unit, move the rail structure from the dispensing zone to the playing zone over the standing zone; and during a playing sequence, during which a player can control the movement of the grabber through the input unit, control a movement range of the rail structure in the second direction Y so that the grabber is not moved above the standing zone.

By allowing the rail structure to move over the standing zone during the pre-playing sequence and by preventing the rail structure to move over the standing zone during the playing sequence, the movement of the rail structure during the game is better controlled. There would be no risk that a grabber with an object picked up enters the standing zone and bumps into the player. During the playing sequence the rail structure can also avoid interference with the dispensing zone.

The gaming machine according to the second aspect can also have one or several following features, according to all the technically possible combinations:

the control unit is configured such that the movement range of the carriage in the second direction Y, during the playing sequence, approximately equals to a maximum dimension of the playing zone in the second direction Y.

In this way in the playing zone the carriage allowed to move freely in both the first direction X and the second direction Y.

the control unit is so configured that in the dispensing zone, the carriage is only allowed to move in the second direction Y.

The carriage with this feature has its movement in the first direction X blocked in the dispensing zone. In this manner the carriage can avoid colliding with the sidewall from the first direction.

the housing has at least one sidewall enclosing the playing zone and the dispensing zone, and a roof, said sidewall and roof being configured such that the standing zone is created for a person below said roof at the exterior of the playing zone delimited by the at least one sidewall.

the second direction Y is perpendicular to the first direction X.

the standing zone has a depth in the second direction Y greater than 0.4 metre, preferably greater than 0.5 metre.

Any feature of the first embodiment can be combined with any feature of the second embodiment.

BRIEF DESCRIPTION OF THE DRAWINGS

The above and further aspects of the disclosure will be explained in more detail below on the basis of a number of embodiments, which will be described with reference to the appended drawings. In the drawings.

DESCRIPTION OF THE INVENTION

Figure 1:
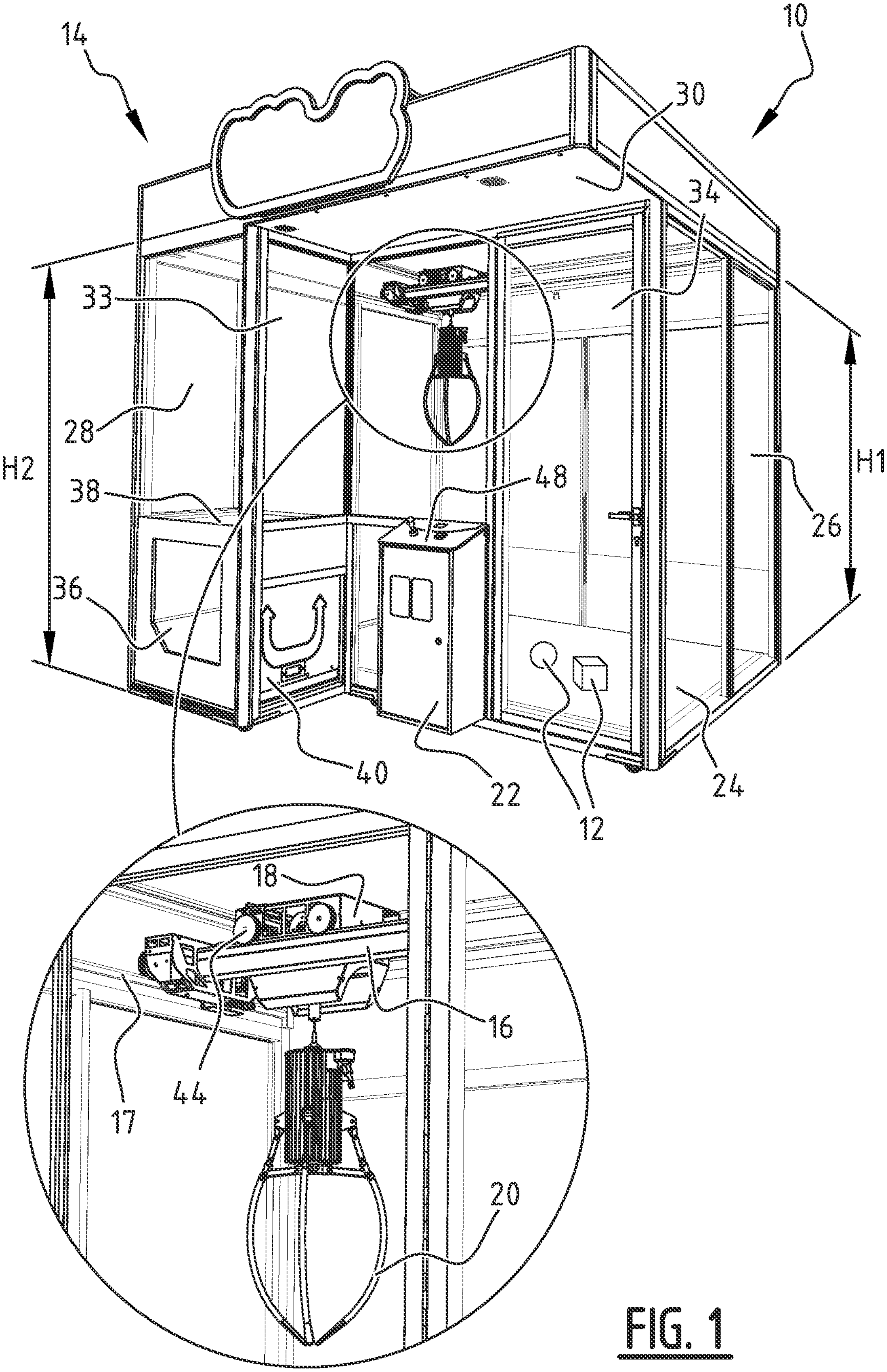
FIG. 1 is a perspective view of a gaming machine according to a first embodiment, with the carriage and the grabber in the playing zone.
Figure 2:
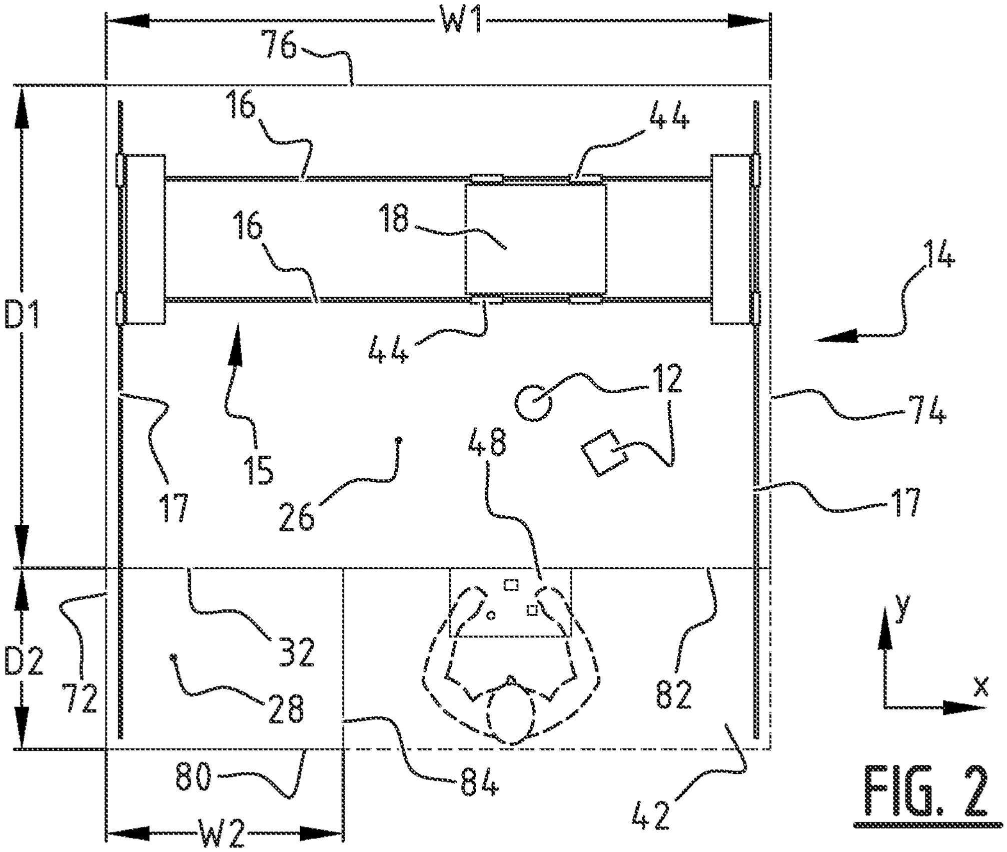
FIG. 2 is a top view of the gaming machine in FIG. 1.

FIG. 1 shows a gaming machine 10 according to the first embodiment. The gaming machine 10 is configured to pick up at least one object 12, in particular a prize to be won. Here, the at least one object 12 preferably comprises toys such as cuddly toys.

The gaming machine 10 comprises a housing 14. The gaming machine 10 also comprises a rail structure 15. The gaming machine 10 also comprises at least one guide rail 17, typically two guide rails 17, for guiding the rail structure 15.

The gaming machine 10 also comprises a carriage 18 and a grabber 20. The gaming machine 10 also comprises a control unit 22.

The housing 14 has at least one sidewall 24. The at least one sidewall 24 encloses a playing zone 26 and a dispensing zone 28. The gaming machine 10 is configured to move the objects 12 through the playing zone 26 to the dispensing zone 28. The housing 14 also comprises a roof 30. The roof 30 covers the at least one sidewall 24 at the top. The housing 14 also comprises a ceiling. The ceiling is located higher than the roof 30. The rail structure 15 is for example able to move between the roof 30 and the ceiling, in particular when the rail structure 15 is at least in part located in the dispensing zone 28 and/or at least in part located above the standing zone 42 (see below for more details on the standing zone). The ceiling closes the playing zone 26 and the dispensing zone 28 from above. The ceiling is for example made of chipboard. As an alternative the ceiling is transparent. The ceiling is for example supported by a beam extending in the first direction X (see below for the details on the first direction X). This beam which supports the ceiling is for example made of metal. This beam which supports the ceiling is for example provided with at least one light, typically three lights, to illuminate the playing zone 26 and/or the dispensing zone 28. Preferably the housing 14 also comprises a separation wall 32 partially separating the dispensing zone 28 from the playing zone 26. The separation wall 32 defines with the ceiling a passage 33 between the playing zone 26 and the dispensing zone 28. The passage 33 is configured to allow the carriage 18 and the grabber 20 to move between the playing zone 26 and the dispensing zone 28.

According to one embodiment at least a portion of the at least one sidewall 24 is transparent. According to one embodiment at least one sidewall 24 is transparent. According to one embodiment each sidewall 24 delimiting the dispensing zone 28 is transparent. As such the player can see all that happens in the dispensing zone 28 during his play. According to one embodiment all the sidewalls 24 are transparent.

According to one embodiment at least part of the separation wall 32 is transparent, preferably the entire separation wall 32 is transparent.

Figure 5:
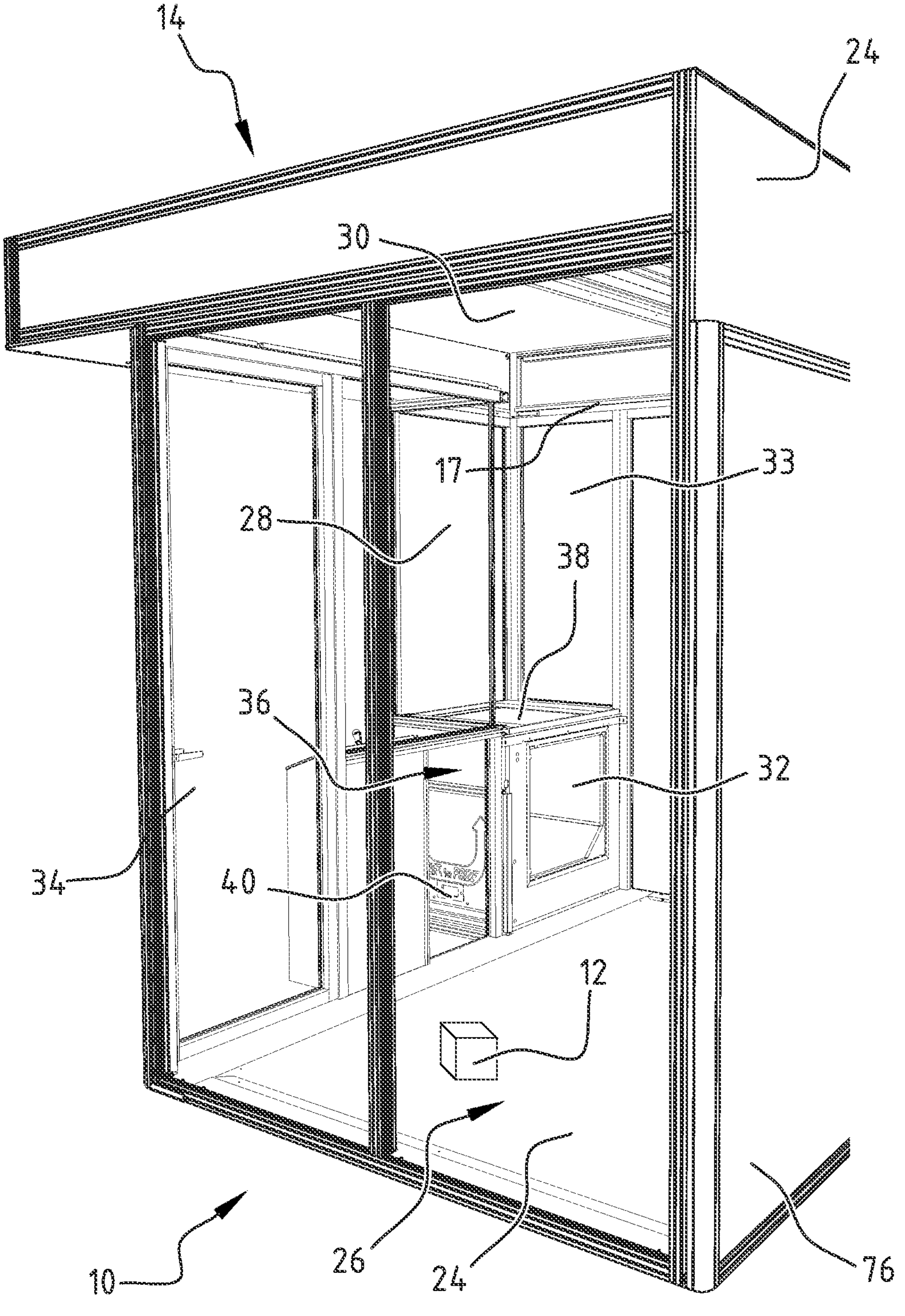
FIG. 5 is a perspective view of the gaming machine in FIG. 3 taken from a different angle from FIG. 4.

In one embodiment as shown in the FIG. 5, at least part of the separation wall 32 is transparent and each sidewall 24 delimiting the dispensing zone 28 is also transparent. In this embodiment a player standing in front of the dispensing zone 28 in face of the separation wall 32 across the dispensing zone 28 can see the objects 12 in the playing zone 26 through the dispensing zone 28 across the separation wall 32. In this way when standing in front of the dispensing zone 28 he can observe what happens in the dispensing zone 28 and across the separation wall 26, what happens in the playing zone 26. As such his experience in the game is even more immersive and is further improved.

Preferably all the sidewalls 24 have the same height.

According to the embodiment in the FIGS. 1 to 5, the housing 14 comprises six sidewalls 24 enclosing an L-shaped space. This L-shaped space comprises the playing zone 26 and the dispensing zone 28.

In particular, the sidewalls 24 are laid out as follows. This is for example according to the embodiment in the FIGS. 1 to 5 where six sidewalls 24 enclose an L-shaped space. The six sidewalls 24 comprise a left wall 72 and a right wall 74. The left wall 72 and the right wall 74 extend in the second direction Y and run approximately parallelly one to the other.

The six sidewalls 24 also comprise a back wall 76, most visible in the FIG. 5. The back wall 76, most visible in the FIG. 5, closes the left wall 72 and the right wall 74 at one end of the left wall 72 and at one end of the right wall 74. The back wall 76 runs approximately in the first direction X.

The six sidewalls 24 also comprise a left front wall 80. The left front wall 80 from the other end of the left wall 72 extends towards the right wall 74. The left wall 72 connects the back wall 76 and the left front wall 80. The left front wall 80 preferably runs in the first direction X. The left front wall 80 preferably runs parallel to the back wall 76. The left front wall 80 in the embodiment of FIGS. 1 to 5 does not reach the right wall 74.

The six sidewalls 24 also comprise a right front wall 82. The right front wall 82 extends from the other end of the right wall 74 opposite the end joining the back wall 76. The right wall 74 connects the back wall 76 and the right front wall 82. The right front wall 82 preferably runs in the first direction X. The right front wall 82 preferably runs parallel to the back wall 76. The right front wall 82 in the embodiment of FIGS. 1 to 5 does not reach the left wall 72. The left wall 72, the back wall 76, the right wall 76, and the right front wall 82, and preferably also the separation wall 32 delimit the playing zone 26.

The six sidewalls 24 also comprise an intermediate sidewall 84. The intermediate sidewall 84 runs approximately in the second direction Y. The intermediate sidewall 84 runs from the left front wall 80. The intermediate sidewall 84 runs towards the back wall 76. For example, the intermediate sidewall 84 has one end joining the left front wall 80 and another end joining the right front wall 82. The intermediate sidewall 84 runs approximately in parallel to the left wall 72 and/or to the right wall 74. The intermediate sidewall 84 in the embodiment is placed between the left wall 72 and the right wall 74. The left wall 72, the left front wall 80, and the intermediate sidewall 84, and preferably also the separation wall 32 delimit the dispensing zone 28.

The playing zone 26 is configured to contain the objects 12 to be picked up. According to the embodiment in the FIGS. 1 to 5, the playing zone 26 is a rectangular cuboid. The playing zone 26 has a first width W1 in a first direction X. The playing zone 26 has a first depth D1 in a direction perpendicular to the first direction X.

According to one embodiment the first width W1 of the playing zone 26 is greater than 1.5 metres in the first direction X, preferably greater than 2.3 metres, and more preferably between 2.3 metres and 2.7 metres.

Preferably the at least one sidewall 24 comprises an access door 34 to the playing zone 26. The access door 34 typically forms a portion of the right front wall 82. The access door 34 is configured to allow an operator to go from the outside of the housing 14 to the inside of the housing 14 across the assess door 34. It for example has a height greater than 1.8 metres, preferably greater than 2 metres, more preferably approximately the same as the height of the sidewalls 24.

According to the embodiment in the FIGS. 1 to 5, the dispensing zone 28 has a second width W2 in the first direction X. According to a preferred embodiment, the second width W2 is strictly lower than the first width W1. The dispensing zone 28 has a second depth D2 in a direction perpendicular to the first direction X.

According to one embodiment the second width W2 of the dispensing zone 28 is greater than 0.7 metre in the first direction X, preferably greater than 0.8 metre, and more preferably between 0.9 metre and 1.2 metres.

According to one embodiment the ratio between the second width W2 and the first width W1 is greater than 0.2, preferably greater than 0.35.

The left wall 72 for example has the length of the sum of D1 and D2, i.e. D1+D2. The right wall 74 for example has the length of D1. The back wall 76 for example has a length of W1.

The left front wall 80 for example has a length of W2.

The right front wall 82 for example has a length of the subtraction of W2 from W1, i.e. W1-W2.

The intermediate sidewall 84 for example has a length of D2.

The dispensing zone 28 comprises a prize box 36. The prize box 36 comprises at least a mouth 38 inside the housing 14. The prize box 36 is configured to receive the object 12 which has been picked up by the grabber 20 and is to leave the gaming machine 10 when the grabber 20 opens above the mouth 38. Preferably the mouth 38 comprises a flap (not shown on the Figures) able to close the mouth 38. The dispensing zone 28 also comprises an object exit 40 on the sidewall 24. The object exit 40 is in connexion with the mouth 38 so that the object 12 can pass from the mouth 38 to the object exit 40 before being collected by the user. The object exit 40 can preferably be locked such that the access to the prize box 36 via the object exit 40 is no longer possible.

The playing zone 26 has a first height H1. The dispensing zone 28 has a second height H2. According to one embodiment the first height H1 of the playing zone 26 is approximately identical to the second height H2 of the dispensing zone 28. According to one embodiment the first height H1 of the playing zone 26 and/or the second height H2 of the dispensing zone 28 is about the same as the height of the at least one sidewall 24.

According to the embodiment shown in the FIGS. 1 to 5, the roof 30 has an approximately rectangular shape. According to another embodiment not represented in the Figures, the roof 30 has a convex shape in the first direction X leading away from the playing zone 26. The roof 30 thus has an increased projected area on the ground. This convex-shaped roof 30 covers a larger area on the ground and can therefore give the user a more immersive experience during the game.

The roof 30 is for example transparent.

According to one embodiment the roof 30 is provided with at least a light (not represented in the Figures). The light is for example able to illuminate its surroundings. According to one embodiment the light is configured to project light rays into the playing zone 26 and/or into the dispensing zone 28. The light brightens up the playing zone 26 and/or the dispensing zone 28.

The gaming machine 10 comprises at least a standing zone 42. The standing zone 42 is configured to receive at least a user. The standing zone 42 is created by a portion of the sidewalls 24 and the roof 30. Here, the standing zone 42 is delimited by the right front wall 82 and the intermediate sidewall 84. The standing zone 42 is located below the roof 30. The standing zone 42 is located at the exterior of the playing zone 26 delimited by a portion of the at least one sidewall 24. The standing zone 42 is partially surrounded by a portion of the sidewalls 24.

The standing zone 42 has a projected area on the ground larger than 0.5 $m^2$, preferably larger than 0.6 $m^2$, more preferably larger than 0.75 $m^2$, still more preferably larger than 0.9 $m^2$, and the most preferably between 0.9 $m^2$ and 2 $m^2$. This gives the user enough space to move around in the standing zone 42.

According to one embodiment, the standing zone 42 has a depth in the direction perpendicular to the first direction X greater than 0.4 metre, preferably greater than 0.5 metre, and more preferably between 0.5 metre and 1 metre.

According to one embodiment the standing zone 42 is located entirely below the roof 30, as shown in the FIGS. 1 to 5. According to one embodiment the standing zone 42 is partially delimited by a portion of the at least one sidewall 24. In this embodiment the standing zone 42 is partially or wholly limited by the roof 30.

According to one embodiment the standing zone 42 has substantially the same height as the sidewalls 24.

The at least one guide rail 17 is configured to guide the rail structure 15 when the rail structure 15 is moved in the second direction Y. According to the embodiment in the FIGS. 1 to 5, the guide rails 17 are located in the housing 14. The gaming machine 10 for example comprises two guide rails 17 placed approximately parallel one to the other, for example along the left wall 72 and the right wall 74. The rail structure 15 is configured to be placed between these two guide rails 17. One of the two guide rails 17 is for example placed along the left wall 72. The other one of the two guide rails 17 is for example placed along the right wall 74.

The rail structure 15 is arranged in the housing 14. The rail structure 15 extends in the first direction X. The rail structure 15 is configured to move in a second direction Y at an angle to the first direction X. According to a preferred embodiment, the second direction Y is perpendicular to the first direction X, as illustrated in the FIGS. 2 and 3. As such the depths D1 and D2 are measured in the second direction Y. Alternatively the second direction Y may not be perpendicular to the first direction X. The second direction Y can be at an angle for example of 85°, or 80°, or 75°, or 60° to the first direction X.

Figure 3:
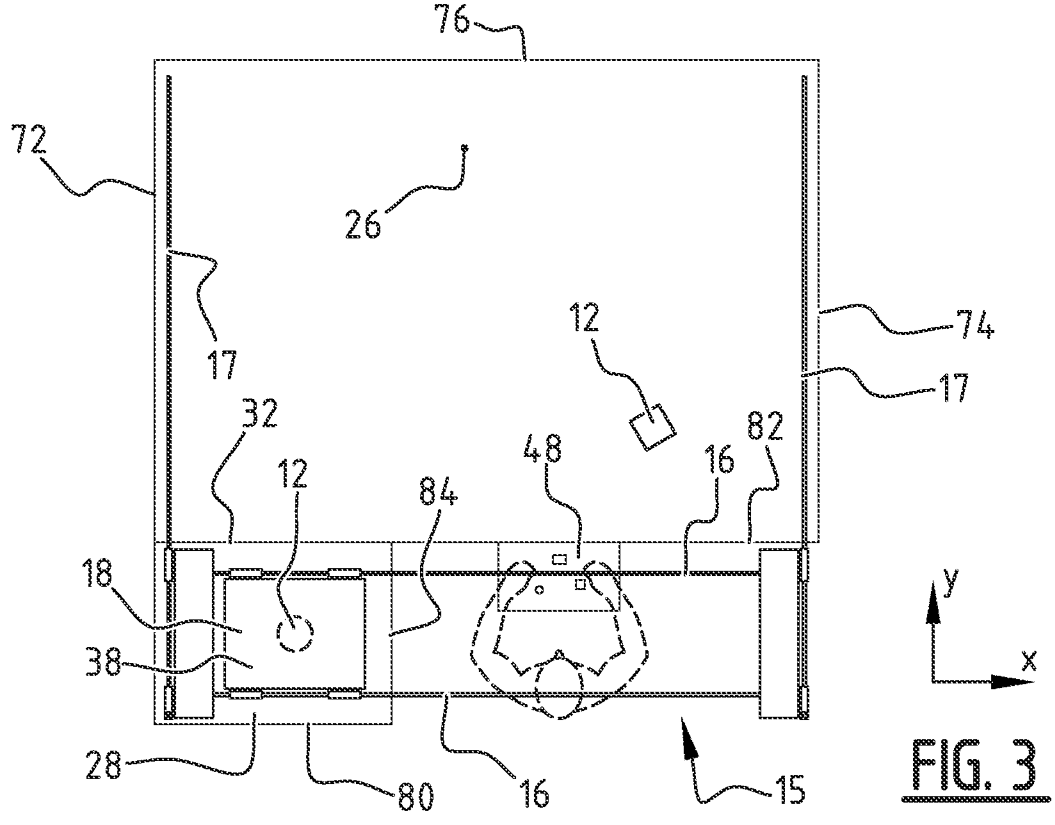
FIG. 3 is a top view of the gaming machine according to the first embodiment, with the carriage and the grabber this time in the dispensing zone.
Figure 4:
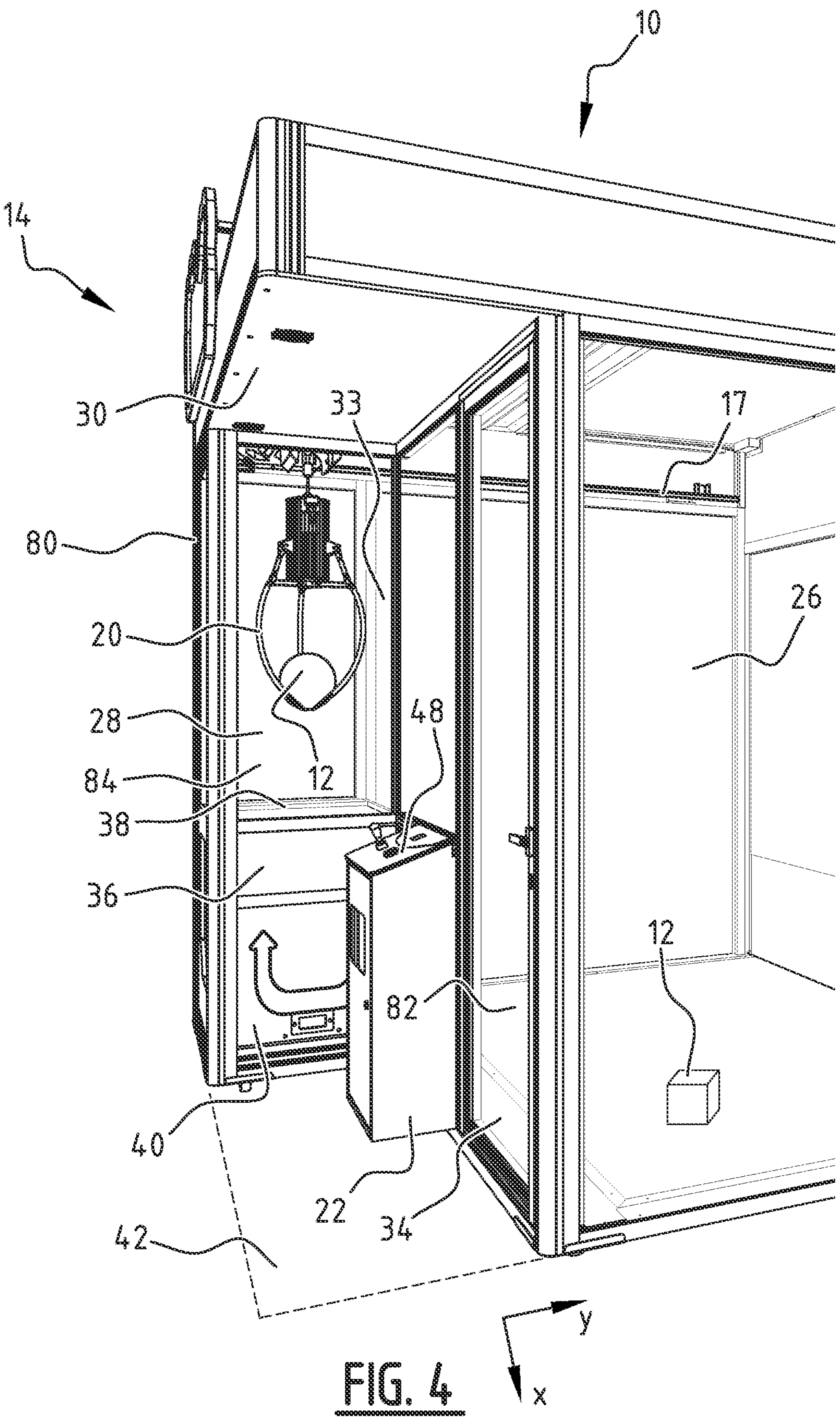
FIG. 4 is a perspective view of the gaming machine in FIG. 3.

The rail structure 15 is configured to move over the standing zone 42, as shown in the FIG. 3. When a part of the rail structure 15 is over the standing zone 42, another part of the rail structure 15 is in the dispensing zone 28. As such the carriage 18 and the grabber 20 can be located in the dispensing zone 28 when a part of the rail structure 15 is over the standing zone 42, as will be explained below. It is also possible that when a part of the rail structure 15 is over the standing zone 42, another part of the rail structure 15 is in the dispensing zone 28 and yet another part of the rail structure 15 is in the playing zone 26, such as the case in the FIGS. 7A-11.

According to one embodiment, the rail structure 15 comprises two rails 16 running approximately parallel one to another.

The carriage 18 is moveably attached to the rail structure 15. The carriage 18 is able to move along the rail structure 15 in the first direction X. The rail structure 15 is configured to guide the movement of the carriage 18 in the first direction X. An example of the carriage 18 is described in detail in the U.S. Pat. No. 7,604,238 B2 which is incorporated in this application in entirety by reference.

In the embodiments of the FIGS. 1 to 5 the carriage 18 is moveably attached to the two rails 16. In particular, as visible in the FIGS. 2 and 3, the carriage 18 comprises four wheels 44 configured to move along the rails 16. Two of the four wheels 44 are configured to move along one of the two rails 16 and the other two of the four wheels 44 are configured to move along the other of the two rails 16.

The grabber 20 is attached to the carriage 18. The grabber 20 is able to move in a direction perpendicular to the first direction X and to the second direction Y. In the normal operating condition of the gaming machine 10, this means the vertical direction, i.e. the grabber 20 is able to move upwards and downwards. It is moveable between an upper position and a lower position. The distance between the carriage 18 and the grabber 20 when the grabber 20 is in its upper position is smaller than the distance between the carriage 18 and the grabber 20 when the grabber 20 is in its lower position. As such the grabber 20 can approach and move away from the objects 12 not yet grabbed by it. The grabber 20 is able to open its claw and close its claw. When the grabber 20 is in the lower position and opens its claw, the claw can surround at least one object 12. When the grabber 20 is in the lower position and closes its claw, the claw can get hold of the object 12 surrounded by its claw. The grabber 20 then typically moves upwards with the picked-up object 12 within its claw.

The grabber 20 is configured to pick up the object 12, for example from the playing zone 26. The grabber 20 is configured to release the object 12 which has been picked up in the dispensing zone 28. Preferably the grabber 20 is configured to release the picked-up object 12 above the mouth 38 of the dispensing zone 28. An example of the grabber 20 is described in detail in the U.S. Pat. No. 7,604,238 B2 which is incorporated in this application in entirety. Another example of the grabber 20 is described in detail in EP 1 322 389 A1 which is also incorporated in this application in entirety.

According to one embodiment the grabber 20 is able to move across the entirety of the first width W1 and/or the entirety of the second width W2. In a variant the grabber 20 is able to move across only a part of the first width W1 and/or only a part of the second width W2.

The gaming machine 10 comprises an input unit 48. The input unit 48 is configured to receive commands from a user for moving the grabber 20. Preferably the input unit 48 is also configured to receive commands from a user for moving the carriage 18 along the rail structure 15. Preferably the input unit 48 is also configured to move the rail structure 15 in the second direction Y, the carriage 18 being carried by the rail structure 15 and moving consequently in the second direction Y as well.

According to one embodiment as illustrated in the FIGS. 1 to 5, the input unit 48 is located in the standing zone 42. The input unit 48 is for example fixed to the sidewall 24. According to one embodiment the input unit 48 is located approximately in the middle of the width of the standing zone 42. According to another embodiment the input unit 48 is located in the right half or in the left half in the width of the standing zone 42.

The input unit 48 for example comprises a first joystick (not represented on the Figures) able to receive commands from the user to move the carriage 18 in the first direction X along the rail structure 15. Preferably the first joystick is also configured to receive commands from the user to move the rail structure 15 in the second direction Y.

As an alternative, the input unit 48 comprises a 'left' button and a 'right' button (not represented on the Figures) able to receive commands from the user to move the carriage 18 in the first direction X along the rail structure 15, from the right to the left and from the left to the right respectively. The input unit 48 may comprises a 'front' button and a 'back' button (not represented on the Figures) to receive commands from the user to move the rail structure 15 in the second direction Y along the guide rail 17, from the back to the front and from the front to the back respectively.

According to one embodiment the input unit 48 also comprises a 'down' button (not represented on the Figures) able to receive commands from the user to move the grabber 20 from the upper position to the lower position in the vertical direction. The vertical direction is perpendicular to the first direction X and to the second direction Y.

According to the embodiment where the gaming machine 10 comprises an access door 34, the input unit 48 is for example fixed to the access door 34.

The control unit 22 is configured to control the movement of the carriage 18 such that, when the rail structure 15 is above the standing zone 42, the movement of the carriage 18 along the rail structure 15 is limited to an area, for example to an area delimited by the sidewall 24. This area delimited by the sidewall 24 has for example a width smaller than 1.5 metres in the first direction X. According to one embodiment the area limited by the sidewall 24 comprises the dispensing area 28. In addition or as an alternative the area limited by the sidewall 24 comprises the playing area 26, such as the case in the FIGS. 7A to 11. According to another embodiment the control unit 22 is configured to control the movement of the carriage 18 such that, when the rail structure 15 is above the standing zone 42, the movement of the carriage 18 along the rail structure 15 is limited to an area smaller than the area delimited by the sidewall 24. According to another embodiment, the control unit 22 is configured to control the movement of the carriage 18 such that, when the rail structure 15 is above the standing zone 42, the movement of the carriage 18 along the rail structure 15 is completely blocked on the rail structure 15.

According to one embodiment the control unit 22 is so configured that the movement range of the carriage 18 in the first direction X in the dispensing zone 28 is more restricted than the movement range of the carriage 18 in the first direction X in the playing zone 26.

According to one embodiment, the control unit 22 is configured to control the movement of the carriage 18 and/or the grabber 20 in the dispensing zone 28. This means that when the carriage 18 and/or the grabber 20 is in the dispensing zone 28, its/their movement is only controlled by the control unit 22. In particular, according to this embodiment when the carriage 18 and/or the grabber 20 is in the dispensing zone 28, the input unit 48 cannot control its/their movement. The control unit 22 in this case ignores commands from the input unit 48. Here, the movement of the carriage 18 and/or of the grabber 20 in the dispensing zone 28 means the movement in the first direction X and in the second direction Y within the dispensing zone 28. The movement of the grabber 20 can also include the meaning of moving upwards and/or moving downwards and/or opening its claw and/or closing its claw.

According to one embodiment, the movement range of the carriage 18 is limited in the second direction Y approximately to the depth D2 of the playing zone 26 in the second direction Y. This is to say, the control unit 22 is able to limit the movement of the carriage 18 to the playing zone 26 and to keep it outside the dispensing zone 28.

According to one embodiment, the control unit 22 is configured to block the movement of the carriage 18 in the first direction X based on the location of the rail structure 15 in the second direction Y. For example, the control unit 22 is able to block the movement of the carriage 18 in the first direction X when the rail structure 15 is located in a second range in the second direction Y. The second range in the second direction Y here for example corresponds to the depth D2 of the dispensing zone 28 in the second direction Y. According to one embodiment, the control unit 22 is so configured that in the dispensing zone 28, the carriage 18 is only allowed to move in the second direction Y but not in the first direction X along the rail structure 15.

According to one embodiment, the control unit 22 is configured to control the movement of the carriage 18 and/or the grabber 20 once the grabber 20 has reached the lower position. As such once the grabber 20 reaches the lower position the user will no longer have any control over the carriage 18 and/or the grabber 20. Once reaching its lower position the control unit 22 is configured to close the claw of the grabber 20, no matter whether an object 12 is within its claw or not, then to move upwards towards the upper position of the grabber 20 under the control of the control unit 22 while ignoring any other controls, in particular ignoring any control from the input unit 48.

According to one embodiment the control unit 22 is configured to move the carriage 18 in the playing zone 26 to the dispensing zone 28 after the grabber 20 had reached the lower position and a grabbing action has been carried out. This embodiment is preferably combined with the possibility that the control unit 22 is configured to control the movement of the grabber 20 once the grabber 20 has reached the lower position. As such once the grabber 18 reaches the lower position the control unit 22 is configured to control the carriage 18 and the grabber 20 until both reach the dispensing zone 28.

As a concrete example, when the rail structure 15 is located in a first range in the second direction Y, the movement range of the carriage 18 in the first direction X is RX1. This movement range RX1 of the carriage 18 is for example greater than 1.5 metres, preferably greater than 1.8 metres, and more preferably greater than 2.1 metres. When the rail structure 15 is located in a second range in the second direction Y, the movement range of the carriage 18 in the first direction X is RX2. This movement range RX2 of the carriage 18 is for example less than 1.5 metres, preferably less than 1.2 metres, and more preferably less than 1 metre.

According to one embodiment, when the rail structure 15 is located in the first range in the second direction Y the movement range of the carriage 18 in the first direction X RX1 is approximately the whole width W1 of the playing zone 26. When the rail structure 15 is located in the second range in the second direction Y the movement range of the carriage 18 in the first direction X RX2 is approximately the whole width W2 of the dispensing zone 28. The first range in the second direction Y is for example the first depth D1. The second range in the second direction Y is for example the second depth D2.

According to one embodiment when the rail structure 15 is located in the second range in the second direction Y, the movement range of the carriage 18 in the first direction X RX2 is approximately zero. As an example of this embodiment, when the carriage 18 is in the dispensing zone 28 the carriage 18 is configured to move together with the rail structure 15 in the second direction Y while being blocked on the rail structure 15 in the first direction X by the control unit 22.

According to one embodiment the control unit 22 is so configured that the carriage 18 is able to move across only a part of the length of the rail structure 15 in the dispensing zone 28 due to the limitation imposed by the control unit 22.

According to one embodiment once the control unit 22 receives a starting signal at the beginning of the game, the control unit 22 is configured to move the carriage 18 from the dispensing zone 28 to the playing zone 26. This moving is preferably controlled only by the control unit 22 while ignoring any other external controls, in particular ignoring any control from the input unit 48.

Figure 6:
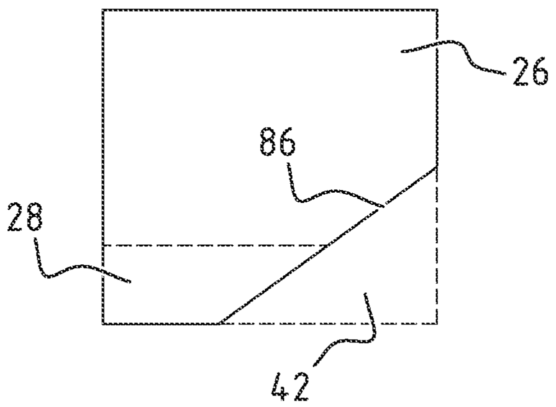
FIG. 6 is a simplified top view of a gaming machine according to another embodiment, the dispensing zone being located to the left of the standing zone.

Turning to the FIG. 6, this Figure illustrates one variant of the embodiment in the FIGS. 1 to 5. Compared with the embodiment in the FIGS. 1 to 5, the sidewalls 24 in the embodiment of FIG. 6 no longer comprise the right front wall or the intermediate sidewall. Instead, in this embodiment the housing 14 comprises five sidewalls 24 enclosing the playing zone 26 and the dispensing zone 28. Amongst the sidewalls 24 there is an oblique sidewall 86 delimiting the standing zone 42. The oblique sidewall 86 may be approximately flat. The oblique sidewall 86 connects the right wall 74 to the left front wall 80. The dispensing zone 28 is located to the left of the standing zone 42.

Other elements in the FIG. 6 are identical to those in the FIGS. 1 to 5. Their features are already described in relation to the FIGS. 1 to 5.

Figure 7A:
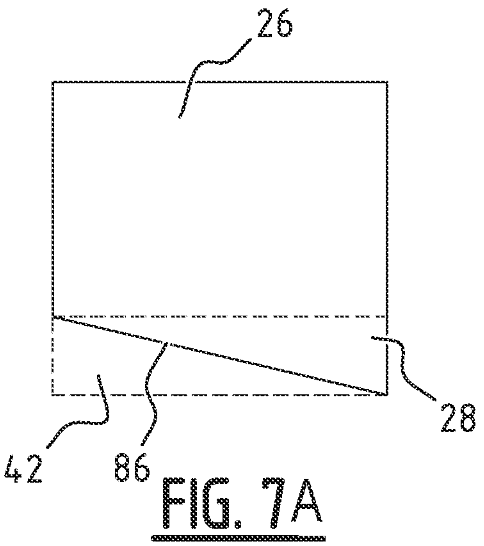
FIG. 7A is a simplified top view of a gaming machine similar to the one in FIG. 6, the dispensing zone being located to the right of the standing zone.

FIG. 7A shows another embodiment. Compared with the embodiment in the FIGS. 1 to 5, the sidewalls 24 no longer comprises a left front wall, or a right front wall, or an intermediate sidewall. Instead, in this embodiment the housing 14 comprises four sidewalls 24 enclosing the playing zone 26 and the dispensing zone 28. The area enclosed by the four sidewalls 24 has for example the shape of a trapezium. The sidewalls 24 comprise an oblique sidewall 86 delimiting the standing zone 42. The oblique sidewall 86 may be approximately flat. The oblique sidewall 86 connects the left wall 72 to the right wall 74. According to one embodiment the oblique sidewall 86 connects one end of the left wall 72 to one end of the right wall 74. The dispensing zone 28 is located to the right of the standing zone 42. The left wall 72, the back wall 76, and the right wall 74 delimit the playing zone 26. The oblique sidewall 86 and the right wall 74 delimit the dispensing zone 28. The roof 30 extends at least partially over the standing zone 42, preferably over the entirety of the standing zone 42.

Other elements in the FIG. 7A are identical to those in the FIGS. 1 to 5. Their features are already described in relation to the FIGS. 1 to 5.

Figure 7B:
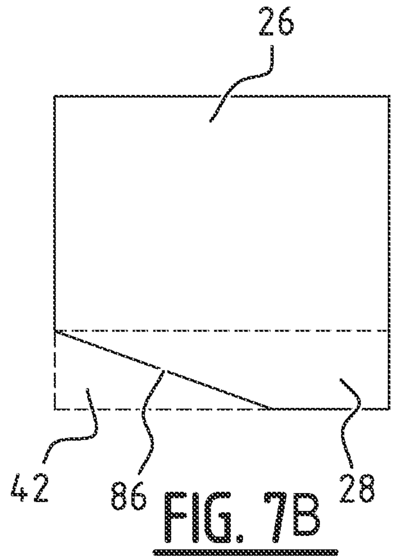
FIG. 7B shows an alternative to the embodiment in FIG. 7A, the dispensing zone still being located to the right of the standing zone but having a different shape.

FIG. 7B shows another embodiment. Compared with the embodiment in the FIGS. 1 to 5, the sidewalls 24 in the embodiment of FIG. 7B no longer comprise the left front wall or the intermediate sidewall. Instead, in this embodiment the housing 14 comprises five sidewalls 24 enclosing the playing zone 26 and the dispensing zone 28. Amongst the sidewalls 24 there is an oblique sidewall 86 delimiting the standing zone 42. The oblique sidewall 86 may be approximately flat. The oblique sidewall 86 connects the left wall 72 to the right front wall 82. The dispensing zone 28 is located to the right of the standing zone 42. The left wall 72, the back wall 76, the right wall 74, and preferably the oblique sidewall 86 as shown in the FIG. 6 delimit the playing zone 26.

Other elements in the FIG. 7B are identical to those in the FIGS. 1 to 5. Their features are already described in relation to the FIGS. 1 to 5.

Figure 8:
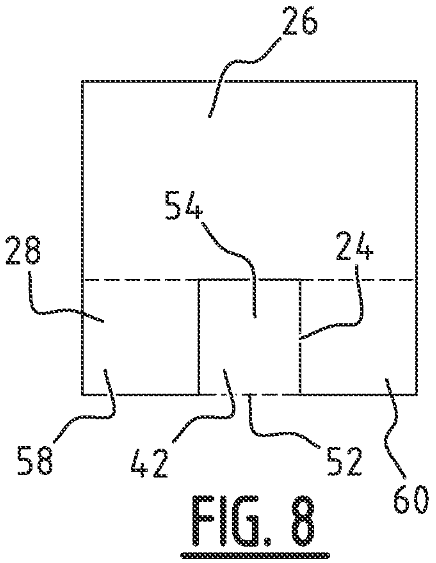
FIGS. 8 to 12 are simplified top views of the gaming machine according to other embodiments, the sidewalls having various shapes.

FIG. 8 shows another embodiment. Compared with the embodiment in the FIGS. 1 to 5, the embodiment in the FIG. 8 no longer comprises a single right front wall 82 connecting the intermediate sidewall 84 and the right wall 74. Instead, in this embodiment the standing zone 42 has an entrance 52 and an interior 54. Here the standing zone 42 has an approximately rectangular shape. The interior 54 is delimited by three sidewalls 24. The fourth side of the standing zone 42 is the entrance 52 configured to allow a user to enter the interior 54 of the standing zone 42 and/or to exit the interior 54 of the standing zone 42.

According to the embodiment represented in the FIG. 8 the housing 14 defines a first sub-zone 58 on the left of the standing zone 42 and a second sub-zone 60 on the right of the standing zone 42 in the first direction X. According to one layout under this embodiment, the first sub-zone 58 comprises the dispensing zone 28. The playing zone 26 comprises the second sub-zone 60. As such when a user is in the standing zone 42, he can see on his right the objects 12 to be picked up and on his left the distribution of the object 12 which has been picked up. As such he feels surrounded by the objects 12. His experience with the game is much improved.

Other elements in the FIG. 8 are identical to those in the FIGS. 1 to 5. Their features are already described in relation to the FIGS. 1 to 5.

Figure 9:
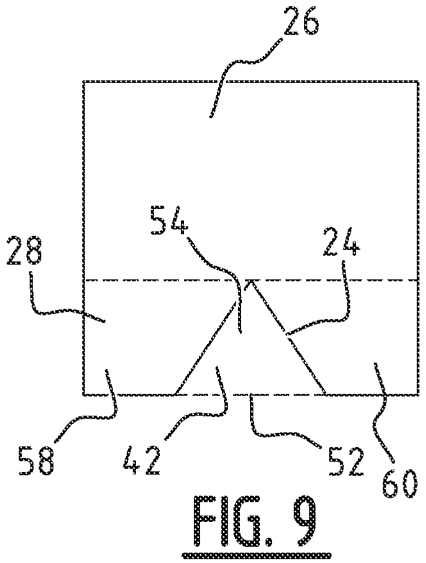

FIG. 9 shows another embodiment similar to the one in the FIG. 8. Here the standing zone 42 has a triangular shape. The interior 54 is delimited by two sidewalls 24 forming two edges of the standing zone 42. The third side of the standing zone 42 is the entrance 52 configured to allow a user to enter the interior 54 of the standing zone 42 and/or to exit the interior 54 of the standing zone 42. The dispensing zone 28 is located to the left or to the right of the standing zone 42.

Other elements in the FIG. 9 are identical to those in the FIGS. 1 to 5. Their features are already described in relation to the FIGS. 1 to 5.

Figure 10:
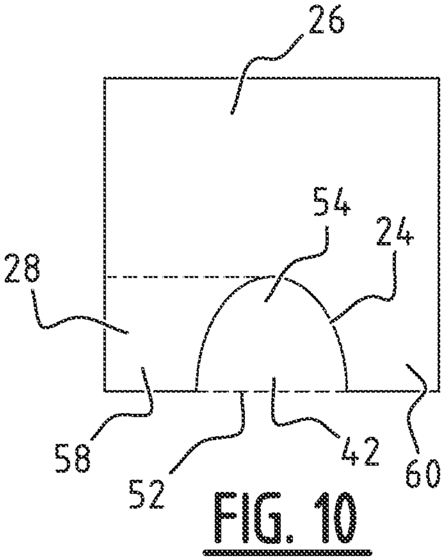

FIG. 10 shows another embodiment similar to the one in the FIG. 8. Here the standing zone 42 has a semi-circular shape. The interior 54 is delimited by one sidewall 24 forming the arc of the standing zone 42. The diameter of the semi-circle is the entrance 52 configured to allow a user to enter the interior 54 of the standing zone 42 and/or to exit the interior 54 of the standing zone 42. The dispensing zone 28 is located to the left or to the right of the standing zone 42.

Other elements in the FIG. 10 are identical to those in the FIG. 9. Their features are already described in relation to the FIGS. 1 to 5 and 9.

Figure 11:
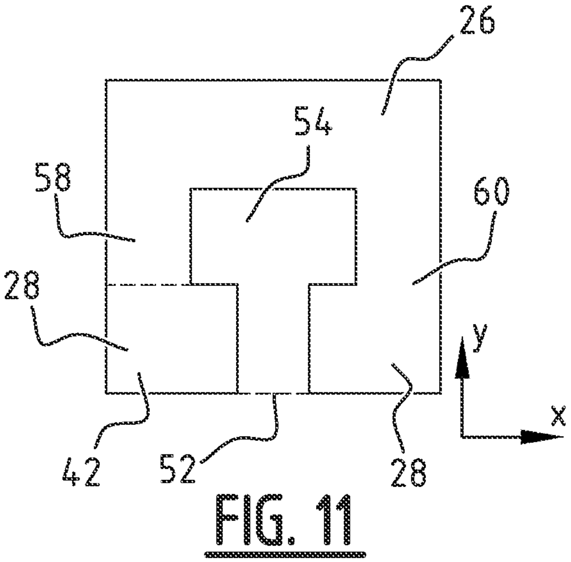

FIG. 11 shows another embodiment similar to the one in the FIG. 8. Here the entrance 52 of the standing zone 42 has a width in the first direction X strictly lower than or equal to the minimal width of the interior 54 of the standing zone 42 in the first direction X. The dispensing zone 28 is for example located to the left of the standing zone 42.

Thanks to this embodiment the user will feel even more surrounded by the objects 12 in the housing 14 due to the restricted entrance 52. His experience in the game is further enhanced.

Other elements in the FIG. 10 are identical to those in the FIGS. 1 to 5. Their features are already described in relation to the FIGS. 1 to 5.

Figure 12:
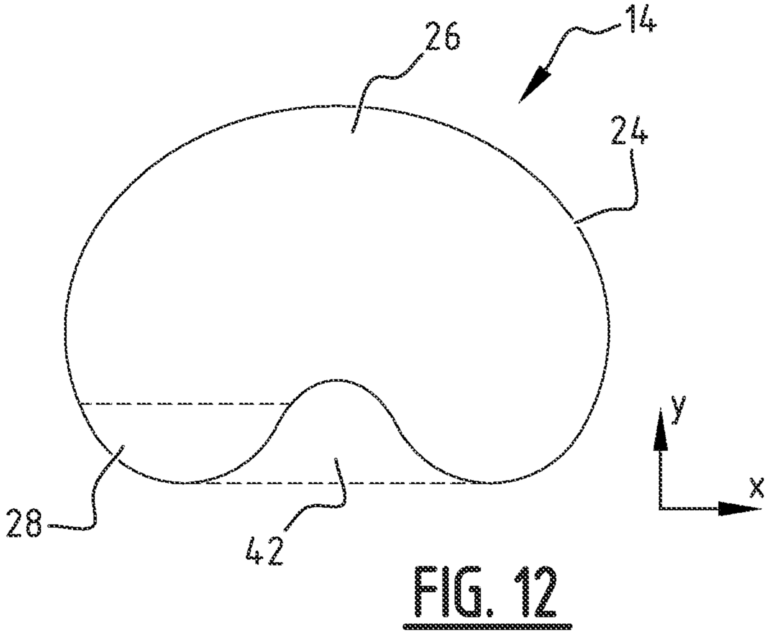

FIG. 12 shows yet another embodiment similar to the one in the FIG. 8. According to this embodiment the housing 14 comprises only one sidewall 24. The sidewall 24 is continuous without any angle on it. According to this embodiment the sidewall 24 comprises at least one concave part delimiting the standing zone 42.

Other elements in the FIG. 12 are identical to those in the FIGS. 1 to 5. Their features are already described in relation to the FIGS. 1 to 5.

In all the embodiments in the FIGS. 6 to 12 the dispensing zone 28 is shown to be located to the left of the standing zone 42 in the first direction X. Alternatively the dispensing zone 28 can located to the right of the standing zone 42 in the first direction X.

The method of operating the gaming machine according to the embodiments in the FIGS. 1 to 5 will now be briefly described in reference to the FIGS. 13A to 13D.

Figure 13A:
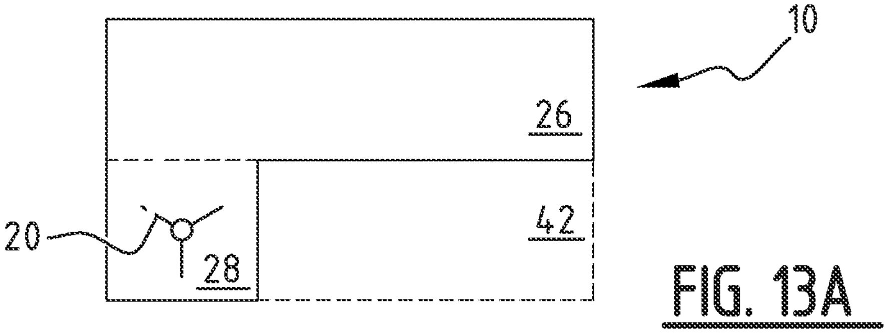
FIGS. 13A to 13D show different steps in a method of using the gaming machine according to one embodiment.

Before the start of the game, as shown in the FIG. 13A, the default position of the carriage 18 is in the dispensing zone 28. The grabber 20 is in the upper position, with its claw open.

When a user wants to play the gaming machine 10, he puts enough credit into the gaming machine 10. This is for example carried out by putting enough coins through a slot.

Figure 13B:
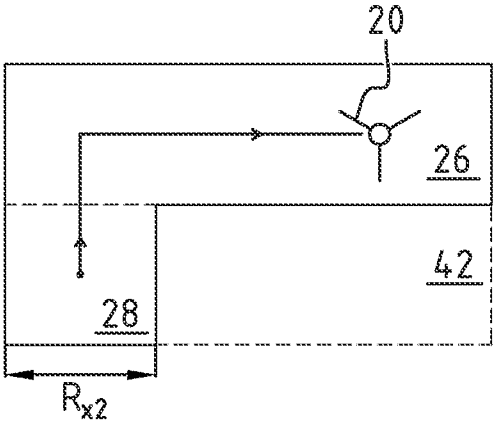

Once the gaming machine 10 confirms that it received sufficient credit for starting the game, it activates the carriage 18. The FIG. 13B shows the pre-playing sequence. As illustrated in the FIG. 13B, the control unit 22 moves the carriage 18 out of the dispensing zone 28 into the playing zone 26. During the pre-playing sequence the rail structure 15 for example is moved over the standing zone 42. According to a preferred embodiment the control unit 22 moves the carriage 18 in the second direction Y into the playing zone 26 without any movement of the carriage 18 in the first direction X. According to another embodiment when the control unit 22 moves the carriage 18 from the dispensing zone 28 into the playing zone 26 the control unit 22 moves the carriage 18 in both the first direction X and in the second direction Y. The movements in the first direction X and in the second direction Y is for example are carried out in a pre-determined order. In another embodiment the control unit 22 moves the carriage 18 in the first direction X into the playing zone 26 without any movement in the second direction Y. When at the start of the game the movement of the carriage 18 and of the grabber 20 is preferably only controlled by the control unit 22.

According to one embodiment the control unit 22 is configured to move the carriage 18 between the dispensing zone 28 and the playing zone 26 while ignoring commands from the input unit 48. This is to say that during the pre-playing sequence the player cannot control the movement of rail structure 15 and/or the grabber 20 through the input unit 48.

According to an alternative, the carriage 18 is moved from the dispensing zone 28 to the playing zone 26 by the control from the input unit 48. During this moving the control unit 22 limits the movement of the carriage 18 in the first direction X. According to one embodiment the movement of the carriage 18 along the rail structure 15 in the first direction X is limited to an area delimited by the sidewall 24, for example limited to the width W2 of the dispensing zone 28, or to less than 75% of the width W2 of the dispensing zone 28, or to less than 50% of the width W2 of the dispensing zone 28, or to less than 30% of the width W2 of the dispensing zone 28, or to less than 25% of the width W2 of the dispensing zone 28, or to less than 10% of the width W2 of the dispensing zone 28. According to one embodiment the carriage 18 moves through the dispensing zone 28 the carriage 18 is blocked on the rail structure 15 without any freedom to move along the rail structure 15 in the first direction X. The carriage 18 in this embodiment is brought out of the dispensing zone 28 only in the second direction Y by the rail structure 15.

Figure 13C:
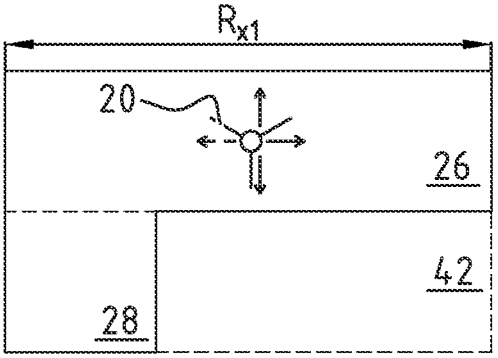
Figure 13D:
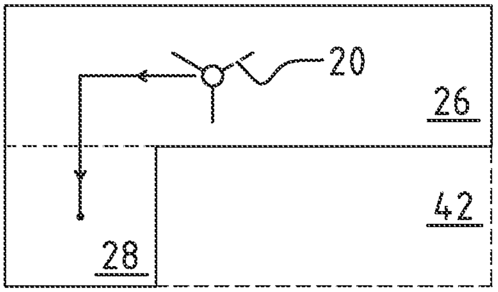

Once in the playing zone 26 the control unit 22 no longer imposes any control on the movement range of the carriage 18 in the first direction X. The FIG. 13C shows the playing sequence. As shown in the FIG. 13C, the carriage 18 can therefore move along the whole length of the rail structure 15. The control on the movement of the carriage 18 in the first direction X and in the second direction Y is typically given by the user through the input unit 48, for example through the first joystick. For example, the user moves the joystick to move the carriage 18 in the first direction X and in the second direction Y until the carriage 18 is approximately above the object 12 that the user wants to pick up. During the playing sequence a player can control the movement of the rail structure 15 and/or of the grabber 20 through the input unit 48.

During the playing sequence the control unit 22 controls the movement range of the rail structure 15 in the second direction Y so that the grabber 20 is not moved above the standing zone 42. The rail structure 15 for example moves within the playing zone 26 during the playing sequence.

According to one embodiment the control unit 22 is configured such that the movement range of the carriage 18 in the second direction Y, during the playing sequence, approximately equals to the maximal dimension of the playing zone 26 in the second direction Y. This maximal dimension is for example the first depth D1.

Also in the playing zone 26 the user controls the grabber 20 through the input unit 48. For example the user moves the grabber 20 from the upper position to the lower position through the input unit 48. According to one embodiment when the grabber 20 is in the lower position the user closes the claw of the grabber 20 through the input unit 48. As an alternative once the grabber 20 reaches the lower position the control unit 22 automatically closes the claw of the grabber 20 without any additional input from the user.

According to another embodiment the control unit 22 limits the length of time during which the user can move the carriage 18. This means after a certain duration the grabber 20 automatically moves to its lower position and closes its claw.

After the grabber 20 closes its claw, the user can no longer control the movement of the carriage 18 and that of the grabber 20. The gaming machine 10 then carries out the post-playing sequence, as shown in the FIG. 13D. After the grabber 20 closes its claw it moves to the upper position automatically no matter how the user handles the input unit 48. The carriage 18 with the grabber 20 then moves from the playing zone 26 to the dispensing zone 28 automatically whatever the control from the user, as shown in the FIG. 13D. Put in another way, when towards the end of the game the movement of the carriage 18 and of the grabber 20 from the playing zone 26 into the dispensing zone 28 is only controlled by the control unit 22.

In one embodiment the return from the playing zone 26 to the dispensing zone 28 follows the same route when the carriage 18 leaves the dispensing zone 28 when the game had started, this time in the other direction.

When the carriage 18 returns to the dispensing zone 28 the carriage 18 moves above the mouth 38. The claw of the grabber 20 then opens. There are then two possibilities depending on whether an object 12 had been picked up. Under the possibility that no object 12 had been picked up, no object will be released from the open claw. The game ends.

Another possibility is that the user has successfully picked up an object 12. When the claw opens the picked-up object 12 drops through the mouth 38 into the prize box 36. At least one sensor (not represented in the Figures) in the prize box 36 detects the presence of an object 12 in the prize box 36. The control unit 22 then closes the mouth 38 for example via the flap. As such the prize box 36 is separated from the rest of the gaming machine 10, in particular from the playing zone 26. After the mouth 38 is closed the control unit 22 unlocks the object exit 40. The user can then open the object exit 40 and retrieve the object 12 from the prize box 36.

After the object 12 is retrieved the control unit 22 checks whether any unexpected item remains in the prize box 36. This in particular avoids the situation where a person crawled into the prize box 36 through the unlocked object exit 40. Once the control unit 22 decides that the prize box 36 is empty it locks the object exit 40 and opens the mouth 38 again. The playing zone 26 is again in communication with the prize box 36.

In this way the gaming machine 10 returns to its default state. Once it receives enough credit the game can begin all over again. As an alternative, if there is still enough credit in the gaming machine 10 the game begins all over again, for example by the carriage 18 leaving the dispensing zone 28 for the playing zone 26.

The present invention is not limited to the embodiments of the gaming machine according to the invention as described in the foregoing. The scope of the invention is solely determined by the appended claims.

The invention claimed is:

1. A gaming machine for picking up at least one object, in particular a prize to be won, and subsequently moving the object through a playing zone to a dispensing zone, the gaming machine comprising:

a housing having at least one sidewall enclosing the playing zone and the dispensing zone, and a roof, said sidewall and roof being configured such that a standing zone is created for a person below said roof at the exterior of the playing zone delimited by the at least one sidewall, a rail structure arranged in the housing and extending in a first direction X, the rail structure being configured to move over said standing zone in a second direction Y at an angle to the first direction X, and a grabber attached to a carriage which is moveably attached to the rail structure, the carriage being configured to move in the first direction X along the rail structure, the grabber being configured to pick up the at least one object.

2. The gaming machine according to claim 1, further comprising a control unit configured to control the movement of the carriage such that, when the rail structure is above the standing zone, the movement of the carriage along the rail structure is limited to an area delimited by the sidewall or avoided.

3. The gaming machine according to claim 2, wherein the aforementioned area delimited by the sidewall has a width less than 1.5 metres in the first direction X.

4. The gaming machine according to claim 1, wherein the playing zone has a width greater than 1.5 metres in the first direction X.

5. The gaming machine according to claim 1, wherein the standing zone is located entirely below the roof.

6. The gaming machine according to claim 1, wherein the standing zone is partially limited by a portion of the at least one sidewall and the roof.

7. The gaming machine according to claim 1, wherein the standing zone has a projected area on the ground larger than 0.5 $m^2$.

8. The gaming machine according to claim 1, wherein the second direction Y is perpendicular to the first direction X.

9. The gaming machine according to claim 8, wherein the standing zone has a depth in the second direction Y greater than 0.4 metre.

10. The gaming machine according to claim 1, wherein in the dispensing zone the carriage is configured to move together with the rail structure in the second direction Y while being blocked on the rail structure in the first direction X.

11. The gaming machine according to claim 1, comprising at least five sidewalls enclosing the playing zone and the dispensing zone, at least one sidewall of the at least five sidewalls delimiting the standing zone.

12. The gaming machine according to claim 1, wherein at least a portion of the at least one sidewall is transparent.

13. The gaming machine according to claim 1, further comprising an input unit configured to receive commands from a player for moving the grabber, wherein the input unit is located in the standing zone.

14. The gaming machine according to claim 13, wherein the control unit is configured to move the carriage between the dispensing zone and the playing zone while ignoring commands from the input unit.

15. A gaming machine for picking up at least one object, in particular a prize to be won, and subsequently moving the object through a playing zone to a dispensing zone, the gaming machine comprising:

a housing defining a standing zone for a player, a rail structure extending in a first direction X, the rail structure being configured to move in a second direction Y at an angle to the first direction X, and a grabber attached to a carriage which is moveably attached to the rail structure, the carriage being configured to move in the first direction X along the rail structure, the grabber being configured to pick up the at least one object, an input unit configured to be controlled by a player, a control unit configured to, during a pre-playing sequence during which a player cannot control a movement of the grabber through the input unit, move the rail structure from the dispensing zone to the playing zone over the standing zone; and during a playing sequence, during which a player can control the movement of the grabber through the input unit, control a movement range of the rail structure in the second direction Y so that the grabber is not moved above the standing zone.

16. The gaming machine according to claim 15, wherein the control unit is configured such that the movement range of the carriage in the second direction Y, during the playing sequence, approximately equals to a maximum dimension of the playing zone in the second direction Y.

17. The gaming machine according to claim 15, wherein the control unit is so configured that in the dispensing zone, the carriage is only allowed to move in the second direction Y.

18. The gaming machine according to claim 15, wherein the housing has at least one sidewall enclosing the playing zone and the dispensing zone, and a roof, said sidewall and roof being configured such that the standing zone is created for a person below said roof at the exterior of the playing zone delimited by the at least one sidewall.

19. The gaming machine according to claim 15, wherein the second direction Y is perpendicular to the first direction X.

20. The gaming machine according to claim 19, wherein the standing zone has a depth in the second direction Y greater than 0.4 metre.

* * * * *